(12) United States Patent
Clark

(10) Patent No.: US 10,075,498 B2
(45) Date of Patent: Sep. 11, 2018

(54) SYSTEMS AND METHODS FOR TRANSMITTING DATA IN REAL TIME

(71) Applicant: VMware, Inc., Palo Alto, CA (US)

(72) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1131 days.

(21) Appl. No.: 13/725,237

(22) Filed: Dec. 21, 2012

(65) Prior Publication Data

US 2014/0181179 A1 Jun. 26, 2014

(51) Int. Cl.
*H04L 29/06* (2006.01)

(52) U.S. Cl.
CPC ........ *H04L 65/608* (2013.01); *H04L 65/4084* (2013.01)

(58) Field of Classification Search
CPC ....... H04L 69/163; H04L 47/10; H04L 69/16; H04L 65/608; H04L 65/4084; H04Q 2213/13348; G06T 2211/428; G08B 27/005; G08B 27/006; H04B 7/0689; H04N 21/23418
USPC ........................................................ 709/203
See application file for complete search history.

(56) References Cited

U.S. PATENT DOCUMENTS

| | | | | |
|---|---|---|---|---|
| 5,860,091 A * | 1/1999 | DeKoning | ............ | G06F 3/0626 711/113 |
| 6,922,401 B1 * | 7/2005 | Dirschedl et al. | ............ | 370/278 |
| 7,493,644 B1 * | 2/2009 | Tanskanen | ........... | H04N 5/4401 725/102 |
| 7,607,062 B2 * | 10/2009 | Grove et al. | .................. | 714/748 |
| 7,856,637 B1 * | 12/2010 | Clark | .................. | G06F 9/44521 719/318 |
| 2001/0052133 A1 * | 12/2001 | Pack | ..................... | G06Q 30/02 725/109 |
| 2002/0118671 A1 * | 8/2002 | Staples | ............... | H04L 12/6418 370/352 |
| 2003/0165133 A1 * | 9/2003 | Garani | ......................... | 370/347 |
| 2004/0015591 A1 * | 1/2004 | Wang | ............................ | 709/228 |

(Continued)

OTHER PUBLICATIONS

French et al., Repair of Streaming Multimedia with Adaptive Forward Error Correction, WPI Computer Science Department, 2001, available at http://citeseerx.ist.psu.edu/viewdoc/summary?doi=10.1.1.97.8693; last visited Dec. 21, 2012.

(Continued)

*Primary Examiner* — Larry Donaghue

(57) ABSTRACT

Systems and methods described herein facilitate the transmission of data in real time by using TCP connections such that the latency issues incurred from packet loss is prevented. A server is in communication with a client, wherein the server is configured to facilitate forming a plurality of TCP connections with the client. The server is also configured to receive one or more requests from the client via the TCP connections, wherein at least one of the requests corresponds to a request to receive data in real time. The server is configured to separate the real-time data into a succession of data sets and associate the data sets to the TCP connections such that each of the succession of data sets is associated with a separate TCP connection. Each of the succession of data sets is transmitted to the client via the associated separate TCP connections.

22 Claims, 2 Drawing Sheets

(56) References Cited

U.S. PATENT DOCUMENTS

| | | | |
|---|---|---|---|
| 2005/0021806 A1* | 1/2005 | Richardson | H04L 12/5601 709/231 |
| 2005/0068911 A1* | 3/2005 | Miyake et al. | 370/299 |
| 2005/0108517 A1* | 5/2005 | Dillon et al. | 713/150 |
| 2006/0200566 A1* | 9/2006 | Ziebarth | 709/227 |
| 2008/0198781 A1* | 8/2008 | Rajakarunanayake et al. | 370/310 |
| 2009/0119706 A1* | 5/2009 | Hope | G11B 27/034 725/38 |
| 2009/0198830 A1* | 8/2009 | Zhang et al. | 709/233 |
| 2009/0262238 A1* | 10/2009 | Hope | G11B 27/034 348/441 |
| 2012/0008679 A1* | 1/2012 | Bakke | H04N 19/186 375/240.08 |
| 2012/0142332 A1* | 6/2012 | Li | 455/419 |
| 2014/0181179 A1* | 6/2014 | Clark | 709/203 |
| 2014/0258365 A1* | 9/2014 | L'Heureux et al. | 709/203 |

OTHER PUBLICATIONS

Quest's EOP "Xtream" does amazing things for RDP latency (with video demo goodness) available at www.brianmadden.com/blogs/videos/archive/2010/07/12/quest-s-eop-quot-xstream-q.

* cited by examiner

SYSTEMS AND METHODS FOR TRANSMITTING DATA IN REAL TIME

BACKGROUND

Streaming data, such as video and/or audio data, to end users or to clients over the internet in real time combines the concept of buffered real-time playback with compression of the data. The internet protocol (IP) is often used with the transmission control protocol (TCP) for the transmission of the data in real time, wherein data on an IP network is organized into packets. However, when packets are being transmitted across a network, packet loss may occur wherein one or more of the packets may fail to reach their destination. Transmission of one or more of the packets may also be delayed. Packet loss or delay can be caused by a number of factors, such as signal degradation over a network medium, rejection of corrupted packets in-transit, faulty networking hardware, or faulty network drivers. Moreover, streaming real-time video and/or audio data to clients over TCP may be difficult because routers may drop or delay packets when they become congested. As a result of dropped and/or delayed packets, real-time playback may not be feasible when using TCP.

In addition, due to the in-order delivery of packets provided by TCP, any missing packet must be retransmitted, inserted in the proper position within the receive queue, and released to an application. During the retransmission of a packet, a TCP retransmit timeout period occurs and a full network round-trip to obtain the missing packet occurs. As such, the retransmission time for a packet may be lengthy. In light of the length for the retransmission time, a significant delay of data may be induced. Further, with streaming video and/or audio data in real time, by the time the data is available, it may be stale and it may need to be discarded. For example, when a packet loss occurs and results in a delay with receiving video or audio data, such as a one second delay, the client may need to skip one second of playing time for the video or audio in order for the client to return to its normal state of buffering/latency.

In view of some of these problems, at least some real-time video and/or audio streaming technologies use the user datagram protocol (UDP) to transmit data to clients in real time. When using UDP, computer applications can transmit messages to other hosts on an IP network without having to establish prior communication for special transmission channels or data paths. More specifically, UDP is suitable for purposes where error checking and correction is not necessary, or where the error checking is performed in the application. Time-sensitive applications often use UDP because dropping packets is preferable to waiting for delayed packets, which may not be an option in a real-time system. However, UDP is not universally available. For example, UDP is not supported by many firewalls and proxies, and UDP is not available to browser-based applications (i.e., web applications). More specifically, browser-based applications are limited to using TCP.

SUMMARY

Systems and methods described herein facilitate the transmission of data in real time by using TCP connections such that the latency issues incurred from packet loss is inhibited. A server is in communication with a client, wherein the server is configured to facilitate forming a plurality of TCP connections with the client. The server is also configured to receive one or more requests from the client via the TCP connections, wherein at least one of the requests corresponds to a request to receive data in real time. The server is configured to separate the real-time data into a succession of data sets and to associate the succession of data sets to the TCP connections such that each of the succession of data sets is associated with a separate TCP connection. The succession of data sets are each transmitted to the client via the associated separate TCP connections.

DETAILED DESCRIPTION

Figure 1:
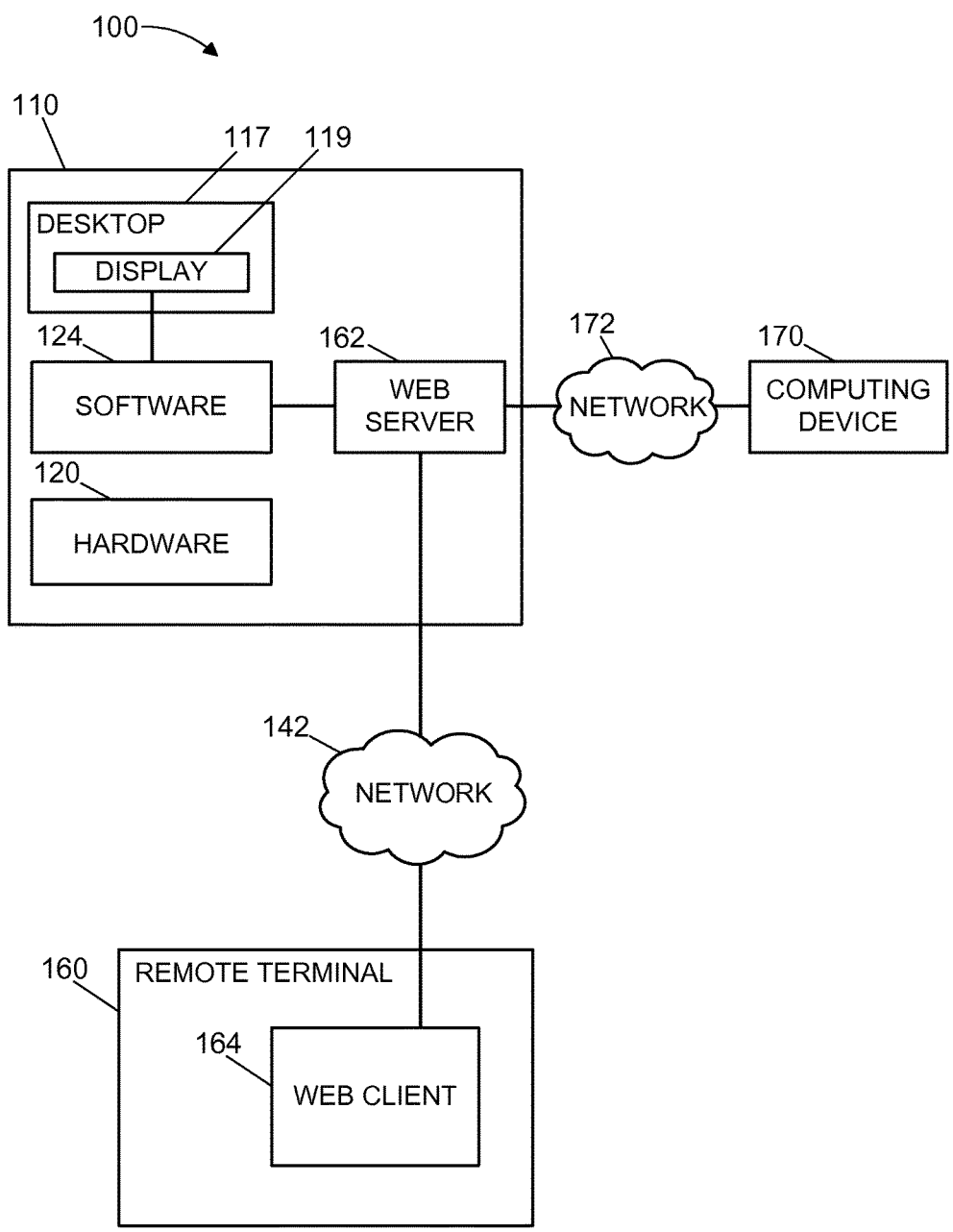
FIG. 1 is an exemplary system having a server in communication with a client.

FIG. 1 shows an exemplary system 100 that includes a physical computer system or host 110. Host 110 includes hardware 120 and software 124 running on hardware 120 such that various applications may be executing on hardware 120 by way of software 124. Software 124 may be implemented directly in hardware 120, e.g., as a system-on-a-chip, firmware, FPGA, etc. Hardware 120 includes at least one processor (not shown), wherein each processor is an execution unit, or "core," on a microprocessor chip. Hardware 120 also includes a system memory (not shown), which is a general volatile random access memory (RAM), a network interface (NIC), and other devices.

In the exemplary embodiment, an end user may connect to, and interact with, host 110 using a remote terminal 160 that is capable of communicating with host 110 via a network 142, which may be the Internet, a LAN, a WAN, or any combination thereof. Remote terminal 160 may be a desktop computer, laptop, mobile device, electronic tablet, thin client, or other similar device. Remote terminal 160 is capable of displaying the graphical user interface (GUI) of applications running inside host 110 to the end user at remote terminal 160 using a computer display (not shown) or similar device. Remote terminal 160 may also be capable of receiving user input from the end user and transmitting the received user input to host 110.

Host 110 provides at least one desktop 117 (only one being shown in FIG. 1) to a user of host 110. In a virtual desktop infrastructure (VDI) deployment, each desktop 117 may be exported from a corresponding one of a plurality of virtual machines (not shown) to a plurality of users in disparate remote locations. Desktop 117 is an interactive user environment provided by the applications running within host 110, and generally includes one or more screens or displays 119 (only one being shown in FIG. 1), but may include other outputs, such as audio, indicator lamps, tactile feedback, etc. Desktop 117 may also accept simulated inputs, such as simulated keyboard and mouse inputs received from remote terminal 160 and injected by software 124 into desktop 117. In addition to user input/output, desktop 117 may send and receive device data, such as input/output for a FLASH memory device local to the user, or to a local printer. In the exemplary embodiment, display 119 may be presented to an end user on the computer display of remote terminal 160.

In the exemplary embodiment, host 110 also includes web server 162 that is in communication with software 124. Web server 162 is in communication with web client 164 via network 142. In some implementations, web server 162 may instead be implemented on a stand-alone server (not shown).

Web client 164, in the exemplary embodiment, is a conventional web browser that is configured to run on remote terminal 160 and connects to web server 162 as necessary to, for example, receive real-time data. In the exemplary embodiment, web server 162 is also coupled to a computing device 170 via a network 172. Network 172, in one embodiment, can be the same network as network 142 or a separate network as shown in FIG. 1. In the exemplary embodiment, computing device 170 is a server that is coupled to an information capturing device (not shown), wherein the information capturing device may be a video and/or an audio recorder. Computing device 170 may include one or more processors or processing units, system memory, and some form of computer readable media. Exemplary computer readable media include flash memory drives, digital versatile discs (DVDs), compact discs (CDs), floppy disks, and tape cassettes.

As explained in more detail below, web server 162, in the exemplary embodiment, is configured to facilitate forming or establishing multiple TCP connections (not shown) with web client 164. As such, real-time data, such as video or audio data, may be transmitted from web server 162 to web client 164 via the TCP connections therebetween. In one embodiment, web server 162 may also be configured to facilitate forming or establishing multiple TCP connections with computing device 170 such that real-time data may be transmitted from computing device 170 to web server 164 via the TCP connections therebetween.

System 100 may be a physical desktop computer system, such as a work or home computer that is remotely accessed when travelling. Alternatively, system 100 may be implemented as part of a virtual desktop infrastructure (VDI) that has a plurality of virtual machines (VMs) (not shown) on host 110. In the latter case, software 124 may be virtualization software and one or more VMs (not shown) may be executing on hardware 120 by way of the virtualization software. It should therefore be understood that the present invention can be implemented in a variety of contexts, but may be particularly useful wherever real-time data is being communicated, as for example when remotely accessing a graphical user interface.

During operation of system 100, as explained in more detail below with respect to FIG. 2, multiple TCP connections between web server 162 and web client 164 are used to transmit real-time data, such as video or audio data, from web server 162 to web client 164. The multiple TCP connections facilitate inhibiting latency issues incurred from packet loss. More specifically, in the exemplary embodiment, web server 162 facilitates forming a plurality of TCP connections with web client 164, and web client 164 transmits one or more requests via one or more of the TCP connections, wherein the request(s) correspond to a request to receive data in real time. Upon receiving the request(s), web server 162 facilitates forming a plurality of TCP connections with computing device 170. In one embodiment, the TCP connections between computing device 170 and web server 162 may be established prior to receiving the request. For example, a previous request may have been made by web server 162 and/or web client 164 to connect with computing device 170. As such, the real-time data that is captured by the information capturing device and transmitted to computing device 170 can be transmitted from computing device 170 to web server 162 via the TCP connection(s).

In the exemplary embodiment, prior to transmitting the real-time data to web client 164, web server 162 separates the real-time data into a sequence of real-time data segments or data sets. Web server 162 then associates the data sets to the TCP connections that web server 162 has with web client 164 such that each TCP connection associated with one of the data sets in the sequence. The data sets are each transmitted from web server 162 to web client 164 via the corresponding associated TCP connections. For example, a first data set is transmitted over a first TCP connection, a second data set is transmitted over a second TCP connection, a third data set is transmitted over a third TCP connection, and a fourth data set is transmitted over a fourth TCP connection. Additional data sets can repeat this sequence so that if there are only four TCP connections, a fifth data set is transmitted over the first TCP connection, the sixth data set is transmitted over the second TCP connection, and so on. In one embodiment, this approach may also be used when the real-time data is transmitted from computing device 170 to web server 162. More specifically, the real-time data that computing device 170 receives from, for example, the information capturing device, may be separated into a plurality of data sets and computing device 170 may associate each of the data sets to separate TCP connections that computing device 170 has with web server 162. As such, each of the data sets may be transmitted from computing device 170 to web server 162 via the associated TCP connections. In such an embodiment, web server 162 would then receive the data sets and associate the data sets with a plurality of separate TCP connections that web server 162 has with web client 164. Web server 162 would then forward the data sets to web client 164 via the associated TCP connections.

When using this approach to transmit real-time data from web server 162 to web client 164, delays due to packet loss may be inhibited. For example, if packet loss occurs, data delivery will only be delayed on one particular TCP connection while transmission on the other TCP connections between web server 162 and web client 164 may continue without being interrupted. Web client 164 then uses only the latest samples and discards past samples that arrived in a delayed manner due to packet loss. This implementation simulates an imperative property of UDP in that delays due to packet loss do not propagate to subsequent packet deliveries. It should be recognized that, while the embodiments described herein reference implementation using a web server and a web client, other server-client implementations are possible and are contemplated.

Figure 2:
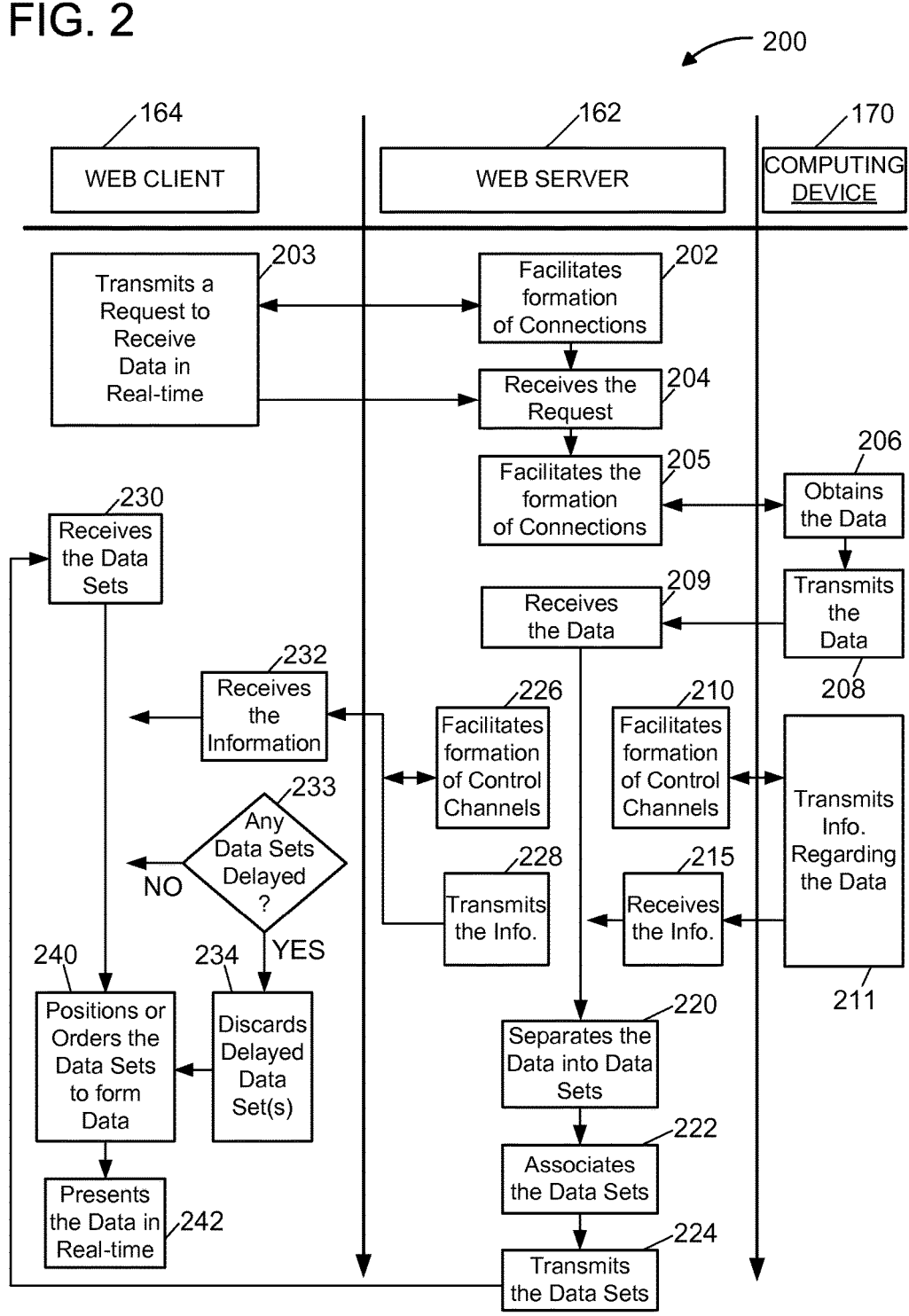
FIG. 2 is a swimlane diagram of an exemplary method for transmitting data in real time from the server to the client.

FIG. 2 shows a swimlane diagram 200 of an exemplary method for transmitting data in real time from web server 162 located within host 110 (shown in FIG. 1) to web client 164 located within remote terminal 160 (shown in FIG. 1). This method may be embodied within a plurality of computer-executable instructions stored in one or more memories, such as one or more computer-readable storage mediums. Computer storage mediums may include non-transitory storage medium such as volatile and nonvolatile random access memory, removable and non-removable mediums implemented in any method or technology for storage of information such as computer-readable instructions, data structures, program modules or other data. The instructions may be executed by one or more processors to perform the functions described herein.

In operation 202, web server 162 facilitates the formation of communication channels with web client 164, wherein the channels facilitate communication between web client 164 and web server 162. More specifically, in the exemplary embodiment, TCP connections (not shown) are formed between web client 164 and web server 162. In operation 203, web client 164 transmits a request to web server 162, wherein the web request corresponds to a request to receive data in real time. For example, web client 164 may transmit a request to web server 162 to receive video and/or audio data in real-time, wherein the request may be transmitted over one of the TCP connections. Web server 162 receives the request in operation 204. Upon receiving the request, web server 162 facilitates the formation of communication channels with computing device 170 in operation 205. For example, TCP connections (not shown) may also be formed between web server 162 and computing device 170. In operation 206, computing device 170 obtains the requested real-time data. For example, in one embodiment, computing device 170 may receive the requested real-time data from the information capturing device (not shown).

Computing device 170 then transmits the data to web server 162 in operation 208. Web server 162 receives the data in operation 209. In addition to forming TCP connections with computing device 170, web server 162 may also facilitate forming one or more control channels, such as COMET or websockets, with computing device 170 in operation 210. For example, the one or more control channels may be two way HTTP connections to enable computing device 170 to transmit information regarding the data sets to web server 162 in operation 211. In one embodiment, the information may include instructions or metadata about the data. In operation 215, web server 162 receives the information regarding the data.

Web server 162 then transmits the real-time data to web client 164. More specifically, in the exemplary embodiment, in operation 220, web server 162 separates the real-time data into a plurality of data sets. For example, where the real time data represents a video or audio stream, web server 162 may separate the real-time video or audio data into a plurality of video or audio frames, respectively. The separation may be done based on the instructions or metadata that web server 162 receives from computing device 170. Web server 162 then associates the successive frames to successive ones of the TCP connections that web server 162 has with web client 164 in operation 222. More specifically, in the exemplary embodiment, web server 162 associates each video or audio frame in a succession of frames with a separate TCP connection. For example, for three successive frames, each will be associated with a separate TCP connection. That is, the first frame will be associated with a first TCP connection, the second frame will be associated with a second TCP connection, and the third frame will be associated with a third TCP connection. The next succession of three frames will be associated with the three TCP connections in the same manner. In operation 224, web server 162 transmits each data set to web client 164 via the associated TCP connections. In the example, the first frame is transmitted over the first TCP connection, the second frame is transmitted over the second TCP connection, and the third frame is transmitted over the third TCP connection. Moreover, in one embodiment, the frames may be transmitted to web client 164 in a sequence. For example, the first frame may be transmitted over the first TCP connection before the other two frames. After the first frame is transmitted to web client 164, then the second frame may be transmitted over the second TCP connection to web client 164. After the second frame is transmitted to web client 164, then the third frame may be transmitted over the third TCP connection to web client 164. The next succession of frames are likewise transmitted over the three TCP connections in the same manner.

Web server 162 may also facilitate forming one or more control channels, such as COMET or websockets, with web client 164 in operation 226. For example, the control channel may be a two way HTTP connection to enable web server 162 to transmit the instructions or metadata received from computing device 170 to web client 164 in operation 228. In operation 230, web client 164 receives the data sets from web server 162 via the TCP connections. For example, web client 164 receives the first, second, and third data sets via the first, second, and third TCP connections, respectively, based on the manner in which they were transmitted from web server 162. In operation 232, web client 164 receives the information, such as instructions or metadata, for the data sets from web server 162. In operation 240, web client 164 positions or orders the data sets based on the information received from web server 162. For example, based on the instructions or metadata, web client 164 may order the data sets in the appropriate sequence. When the data sets are ordered appropriately, then the data can be presented in real time, in operation 242, to an end use of remote terminal 160.

In the exemplary embodiment, if packet loss occurs during the transmission of the real-time data, data delivery will only be delayed on one particular TCP connection while transmission on the other TCP connections between web server 162 and web client 164 may continue without being interrupted. More specifically, during the transmission of the data sets from web server 162 to web client in operation 224, if packet loss occurs with one of the data sets, then only the affected data set that is being transmitted over the associated TCP connection would be delayed and the other remaining data sets would continue being transmitted to web 164. For example, if the packet loss occurs for the second data set, then only the transmission of the second data set over the second TCP connection is delayed, and the first and thirds data sets would continue to be transmitted to web client 164.

As such, in operation 233, web client 164 identifies if any of the data sets received from web server 162 arrived late, for example, due to packet loss. More specifically, web client 164 identifies if any of the data sets received from web server 162 arrived later than a predefined period of time, which may be an expected time for receiving the data sets. For example, the web client 164 may identify that the second data set is late. If any data sets arrived late, then web client 164 discards those data sets in operation 234. Then, in operation 240, web client 164 only uses the data sets that arrived in a timely manner to position or order appropriately. Moreover, in operation 242, only the data sets that arrived in a timely manner are presented to the end user of the remote terminal 160. For example, only the first and third frames may be presented to the end user. It should be recognized that any number of concurrent TCP connections may be maintained. For example, if a video stream provides 15 frames per second and there are 5 TCP connections, then failure to receive one network packet can result in just three frames lost out of the 15 for each of the several seconds it might take for that TCP connection to recognize the packet was not received and retransmit it so that TCP connection becomes in sync with the other TCP connections.

In one embodiment, the real-time data may be generated at webserver 162. Referring to FIG. 1, for example, real-time data may include updates to display 119 of desktop 117 as it is remotely accessed by a user of remote terminal 160. In another embodiment, the real-time data is received from third computing device 170, and the method used to transmit the real-time data from web server 162 to web client 164 may also be used when the real-time data is being transmitted from computing device 170 to web server 162. For example, after obtaining the data from the information capturing device in operation 206 and prior to transmitting the data to web server 162 in operation 208, computing device 170 may first separate the data into a plurality of data sets, similar to operation 220, and then associate each of the data sets with separate TCP connections between computing device 170 and web client 162, similar to operation 222. For video and audio streaming, as an example, computing device 170 may separate the video or audio data received from the information capturing device into a plurality of video or audio frames, respectively. Computing device 170 may then associate each video or audio frame with a separate TCP connection that computing device 170 has with web server 162. For example, if there are three different frames, then each of the three different frames will be associated with a separate TCP connection. Similar to operation 212, computing device 170 would then transmit each data set to web server 162 via the associated TCP connections between computing device and web server 162. For example, the first frame is transmitted over the first TCP connection, the second frame is transmitted over the second TCP connection, and the third frame is transmitted over the third TCP connection. Each frame may represent a segment of real-time data and single image in a series of images, and in transmission, be divided into a plurality of packets by the TCP layer of the network stack. It is also possible for multiple frames or real-time data segments to be In such an embodiment, web server 162 would no longer need to separate the data into data sets, as shown in operation 220. More specifically, upon receiving the data sets, web server 162 associates each succession of data sets with a plurality of separate TCP connection that web server 162 has established with web client 164, and each data set may then be forwarded to web client 164 via the associated TCP connections.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, as mentioned above, one or more embodiments of the present invention may also be provided with a virtualization infrastructure. While virtualization methods may assume that virtual machines present interfaces consistent with a particular hardware system, virtualization methods may also be used in conjunction with virtualizations that do not correspond directly to any particular hardware system. Virtualization systems in accordance with various embodiments, implemented as hosted embodiments, non-hosted embodiments or as embodiments that tend to blur distinctions between the two, are all envisioned. Furthermore, various virtualization operations may be wholly or partially implemented in hardware, or implemented with traditional virtualization or paravirtualization techniques. Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system comprising:
   a server in communication with a client, wherein said server is configured to:
   facilitate forming a plurality of transmission control protocol (TCP) connections with the client;
   receive one or more requests from the client via the plurality of TCP connections, wherein at least one of the one or more requests corresponds to a request to receive data in real time;

separate the real-time data into a succession of data sets based on the order in which frames of the real-time data are received by placing a first predetermined number of received frames into a first data set and each consequent predetermined number of received frames into a corresponding consequent data set;

associate the succession of data sets to the plurality of TCP connections such that each of the succession of data sets is associated with a separate TCP connection of the plurality of TCP connections; and transmit each of the succession of data sets to the client via the associated separate TCP connections.

2. The system of claim 1, wherein said server is further configured to transmit each of the succession of data sets to the client in a sequence via the associated separate TCP connections.

3. The system of claim 1, wherein at least one of the one or more requests corresponds to a request for video data in real time.

4. The system of claim 1, wherein at least one of the one or more requests corresponds to a request for audio data in real time.

5. The system of claim 1, further comprising a computing device that is in communication with said server.

6. The system of claim 5, wherein said server is further configured to receive the real-time data from said computing device.

7. The system of claim 1, wherein the succession of data sets includes a plurality of frames.

8. The system of claim 1, wherein said server is further configured to:

facilitate forming one or more control channels with the client; and transmit informational data regarding the real-time data to the client via the one or more control channels.

9. At least one non-transitory computer-readable storage medium having computer-executable instructions embodied thereon, wherein, when executed by at least one processor, the computer-executable instructions cause the at least one processor to:

facilitate forming a plurality of transmission control protocol (TCP) connections with a client;

receive one or more requests from the client via the plurality of TCP connections, wherein at least one of the one or more requests corresponds to a request to receive data in real time;

separate the real-time data into a succession of data sets based on the order in which frames of the real-time data are received by placing a first predetermined number of received frames into a first data set and each consequent predetermined number of received frames into a corresponding consequent data set;

associate the succession of data sets to the plurality of TCP connections such that each of the succession of data sets is associated with a separate TCP connection of the plurality of TCP connections; and transmit each of the succession of data sets to the client via the associated separate TCP connections.

10. The at least one non-transitory computer-readable storage medium of claim 9, wherein the computer-executable instructions further cause the at least one processor to transmit each of the succession of data sets to the client in a sequence via the associated separate TCP connections.

11. The at least one non-transitory computer-readable storage medium of claim 9, wherein the computer-executable instructions further cause the at least one processor to receive the real-time data from a computing device.

12. The at least one non-transitory computer-readable storage medium of claim 9, wherein one of the one or more requests corresponds to a request for video data in real time.

13. The at least one non-transitory computer-readable storage medium of claim 9, wherein at least one of the one or more requests corresponds to a request for audio data in real time.

14. The at least one non-transitory computer-readable storage medium of claim 9, wherein the succession of data sets includes a plurality of frames.

15. The at least one non-transitory computer-readable storage medium of claim 9, wherein the computer-executable instructions further cause the at least one processor to:

facilitate forming one or more control channels with the client; and transmit informational data regarding the real-time data to the client via the one or more control channels.

16. A method for transmitting data in real time, said method comprising:

facilitating the formation of a plurality of transmission control protocol (TCP) connections with a client;

receiving one or more requests from the client via the plurality of TCP connections, wherein at least one of the one or more requests corresponds to a request to receive data in real time;

separating the real-time data into a succession of data sets based on the order in which frames of the real-time data are received by placing a first predetermined number of received frames into a first data set and each consequent predetermined number of received frames into a corresponding consequent data set;

associating the succession of data sets to the plurality of TCP connections such that each of the succession of data sets is associated with a separate TCP connection of the plurality of TCP connections; and transmitting each of the succession of data sets to the client via the associated separate TCP connections.

17. The method of claim 16, wherein transmitting each of the succession of data sets comprises transmitting each of the succession of data sets to the client in a sequence via the associated separate TCP connections.

18. The method of claim 16, further comprising receiving the real-time data from a computing device.

19. The method of claim 16, wherein receiving one or more requests from the client comprises receiving one or more requests from the client via the plurality of connections such that at least one of the one or more requests corresponds to a request for video data in real time.

20. The method of claim 16, wherein receiving one or more requests from the client comprises receiving one or more requests from the client via the plurality of connections such that at least one of the one or more requests corresponds to a request for audio data in real time.

21. A system comprising:

a client in communication with a server via a plurality of transmission control protocol (TCP) connections, wherein said client is configured to:

transmit one or more requests to the server via the plurality of TCP connections, wherein at least one of the one or more requests corresponds to a request to receive data in real time;

receive a succession of data sets that correspond to the real-time data from the server via the plurality of TCP connections, wherein the real-time data is separated into the succession of data sets based on the order of frames in the real-time data such that a first predetermined number of frames are placed into a first data set and each consequent predetermined number of frames are placed in a corresponding consequent data set, wherein each of the succession of data sets is associated with a separate TCP connection of the plurality of TCP connections such that each of the succession of data sets is received via the associated separate TCP connection;

identify which of the received succession of data sets is received later than a predefined period of time; and discard each of the identified data sets.

22. A system of claim 21, wherein said client is further configured to present the succession of data sets that are received within the predefined period of time to an end user.

* * * * *